(12) United States Patent
Jian

(10) Patent No.: US 8,446,461 B2
(45) Date of Patent: May 21, 2013

(54) THREE-DIMENSIONAL (3D) DISPLAY METHOD AND SYSTEM

(75) Inventor: Peiyun Jian, Shenzhen (CN)

(73) Assignee: SuperD Co. Ltd., Shenzhen (CN)

(*) Notice: Subject to any disclaimer, the term of this patent is extended or adjusted under 35 U.S.C. 154(b) by 365 days.

(21) Appl. No.: 12/892,931

(22) Filed: Sep. 29, 2010

(65) Prior Publication Data

US 2012/0019628 A1    Jan. 26, 2012

(30) Foreign Application Priority Data

Jul. 23, 2010 (CN) .......................... 2010 1 0235272
Jul. 23, 2010 (CN) .......................... 2010 1 0244525
Jul. 23, 2010 (CN) .......................... 2010 1 0244533

(51) Int. Cl.
*H04N 13/04* (2006.01)
(52) U.S. Cl.
USPC .......................................................... 348/51

(58) Field of Classification Search
USPC .......................................................... 348/51
See application file for complete search history.

(56) References Cited

U.S. PATENT DOCUMENTS 8,139,925 B2 * 3/2012 Sasaki et al. .................. 386/329
2010/0303442 A1 * 12/2010 Newton et al. ................ 386/241

* cited by examiner

*Primary Examiner* — Christopher S Kelley
*Assistant Examiner* — Zhen Jessica Li
(74) *Attorney, Agent, or Firm* — Anova Law Group, PLLC

(57) ABSTRACT

A method is provided for a three-dimensional (3D) display system. The method includes obtaining a plurality of original images of a plurality of viewpoints in a 3D image, detecting a type of a display device for displaying the 3D image, and determining a total number of required images based on the detected type of the display device. The method also includes determining whether the total number of required images is equal to a total number of the plurality of original images, and adjusting the plurality of original images such that the total number of required images are provided, when the total number of required images is not equal to the total number of the plurality of original images.

9 Claims, 4 Drawing Sheets

THREE-DIMENSIONAL (3D) DISPLAY METHOD AND SYSTEM

CROSS-REFERENCES TO RELATED APPLICATIONS

This application claims the priority of Chinese patent application no. 201010244525.1 filed on Jul. 23, 2010, Chinese patent application no. 201010244533.6 filed Jul. 23, 2010, and Chinese patent application no. 201010235272.1 filed Jul. 23, 2010, the entire contents of all of which are incorporated herein by reference.

FIELD OF THE INVENTION

The present invention relates to three-dimensional (3D) display technologies and, more particularly, to the methods and systems for stereoscopic 3D display.

BACKGROUND

Three-dimensional (3D) display devices often simultaneously display two sets of images with a certain parallax between them on a display screen, so that a user can watch the two sets of images through the left eye and the right eye respectively to perceive 3D images.

Current 3D display technologies require a 3D video source to include multiple sets of images with parallax. 3D video sources may be structurally divided into 3 different types: multi-view, 2D plus depth, and stereo. The three types of video source formats may correspond to different 3D display technologies, or to different 3D display devices. For example, autostereoscopic display technology and stereoscopic display technology require different 3D video source formats, meaning that the specific types of 3D video source formats require specific 3D display devices in order to display 3D images. Autostereoscopic display devices may also include different kinds, such as those requiring 2, 3, 4, . . . sets of images, while a stereoscopic display device watching with glasses only requires 2 sets of images. Therefore, 3D video sources are often not compatible on different 3D display devices.

The disclosed methods and systems are directed to solve one or more problems set forth above and other problems.

BRIEF SUMMARY OF THE DISCLOSURE

One aspect of the present disclosure includes a method for a three-dimensional (3D) display system. The method includes obtaining a plurality of original images of a plurality of viewpoints in a 3D image, detecting a type of a display device for displaying the 3D image, and determining a total number of required images based on the detected type of the display device. The method also includes determining whether the total number of required images is equal to a total number of the plurality of original images, and adjusting the plurality of original images such that the total number of required images are provided, when the total number of required images is not equal to the total number of the plurality of original images.

Another aspect of the present disclosure includes a 3D display system. The 3D display system includes a display module, a detection module, a control module, and an image generation module. The detection module is configured to detect a type of a display device of the display module, and to determine a total number of required images based on the detected type of the display device. The control module is configured to obtain a plurality of original images of a plurality of viewpoints in a 3D image, and to determine whether the total number of required images is equal to a total number of the plurality of original images. The control module is also configured to adjust the plurality of original images such that the total number of required images are provided, when the total number of required images is not equal to the total number of the plurality of original images.

Another aspect of the present disclosure includes a computer readable medium containing executable computer instructions for performing a method for a three-dimensional (3D) display system. The method includes obtaining a plurality of original images of a plurality of viewpoints in a 3D image, detecting a type of a display device for displaying the 3D image, and determining a total number of required images based on the detected type of the display device. The method also includes determining whether the total number of required images is equal to a total number of the plurality of original images, and adjusting the plurality of original images such that the total number of required images are provided, when the total number of required images is not equal to the total number of the plurality of original images.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
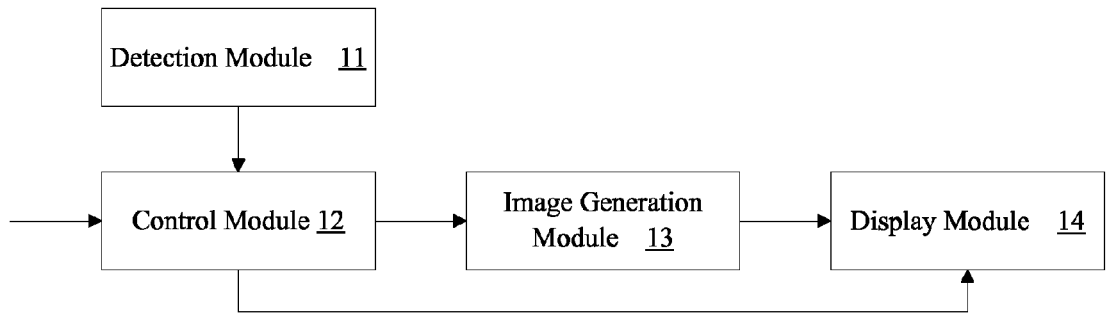
FIG. 1 shows a block diagram of an exemplary 3D display system consistent with the disclosed embodiments.

FIG. 1 shows an exemplary block diagram of a three-dimensional (3D) display system 10. 3D display system 10 may include any appropriate device that capable of processing and displaying a 3D image, such as a computer, a television set, a smart phone, or a consumer electronic device. As shown in FIG. 1, 3D display system 10 may include a detection module 11, a control module 12, an image generation module 13, and a display module 14. Other modules or components may also be included.

Detection module 11 may check, detect, and/or collect any appropriate system information about 3D display system 10 and operational information thereof. For example, detection module 11 may detect a particular type of display device of display module 14, and may also determine a total number of sets of images of different viewpoints required by the particular type of display device. Other information may also be detected.

Image generation module 13 may include any appropriate device capable of performing any appropriate image processing related to 3D images. Display module 14 may include any appropriate display screen based on plasma display panel (PDP) display, cathode ray tube (CRT) display, liquid crystal display (LCD), organic light emitting diode (OLED) display, or other types of displays. Display module 14 may also include any appropriate optical device such as a lenticular lens screen or parallax barrier to facilitate 3D displays.

Further, control module 12 may include any appropriate computing device capable of controlling various modules of 3D display system 10 to improve 3D display quality of 3D display system 10.

Figure 2:
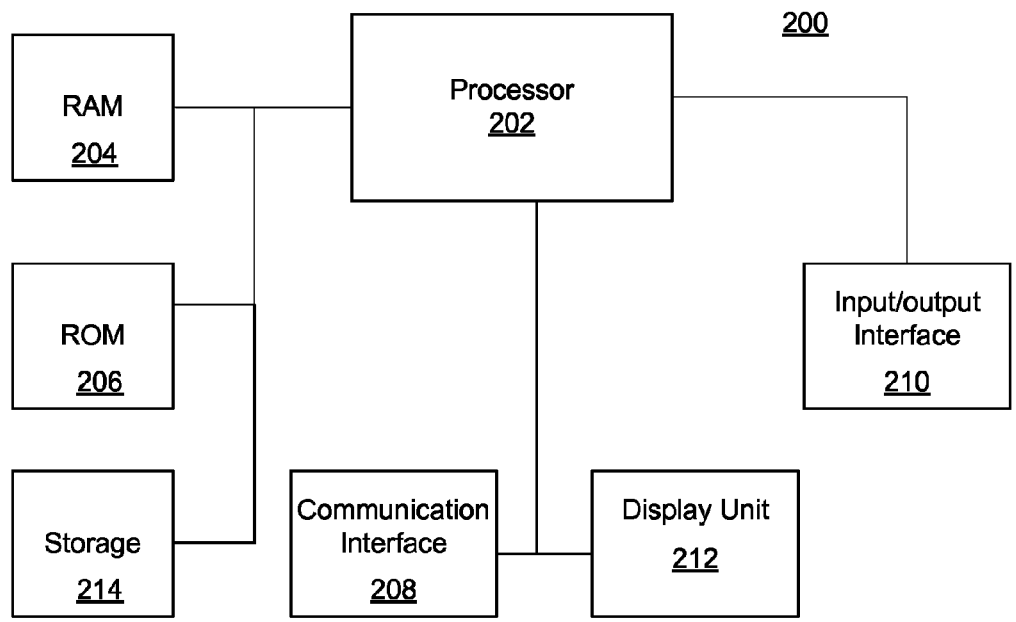
FIG. 2 illustrates another block diagram of an exemplary 3D display system consistent with the disclosed embodiments.

Detection module 11, control module 12, image generation module 13, and display module 14 may be implemented in hardware, software, or a combination of hardware and software. FIG. 2 illustrates a block diagram of a computing system 200 implementing various modules of 3D display system 10. As shown in FIG. 2, computing system 200 may include a processor 202, a random access memory (RAM) unit 204, a read-only memory (ROM) unit 206, a communication interface 208, an input/output interface unit 210, a display unit 212, and a storage unit 214. Other components may be added and certain devices may be removed without departing from the principles of the disclosed embodiments.

Processor 202 may include any appropriate type of graphic processing unit (GPU), general purpose microprocessor, digital signal processor (DSP) or microcontroller, and application specific integrated circuit (ASIC). Processor 202 may execute sequences of computer program instructions to perform various processes associated with system 200. The computer program instructions may be loaded into RAM 204 for execution by processor 202 from read-only memory 206.

Communication interface 208 may provide communication connections such that computing system 200 may be accessed remotely and/or communicate with other systems through computer networks or other communication networks via various communication protocols, such as transmission control protocol/internet protocol (TCP/IP), hyper text transfer protocol (HTTP), etc.

Input/output interface 210 may be provided for users to input information into computing system 200 or for the users to receive information from computing system 200. For example, input/output interface 210 may include any appropriate input device, such as a remote control, a keyboard, a mouse, an electronic tablet, voice communication devices, or any other optical or wireless input devices. Display unit 212 may include any appropriate display screen such as display module 14. Further, storage unit 214 may include any appropriate type of storage medium, such as a CD-ROM, a hard disk, a flash drive, an optical storage, a DVD drive, or other type of storage devices.

Figure 3:
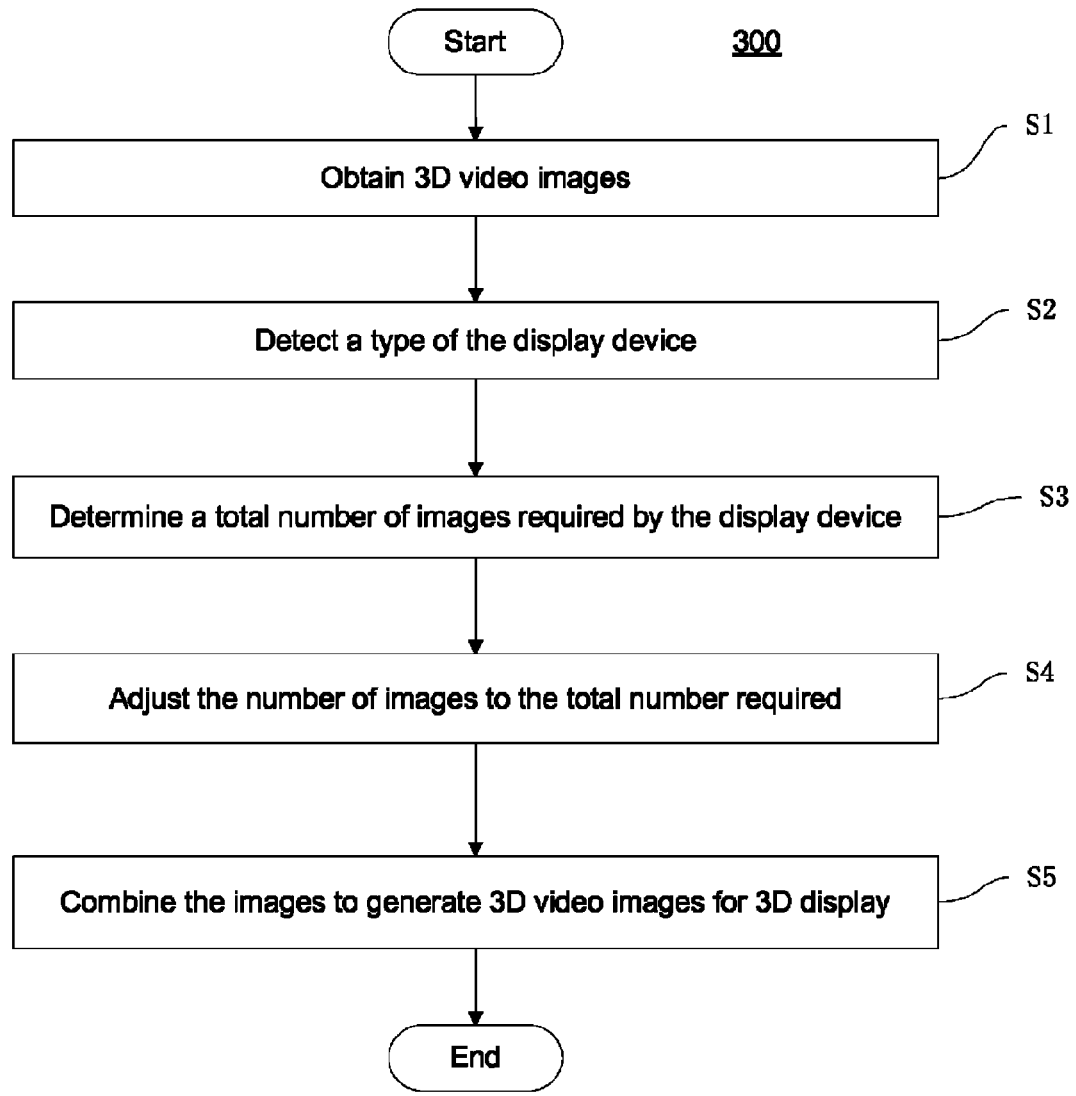
FIG. 3 illustrates an exemplary operational process consistent with the disclosed embodiments.

During operation, 3D display system 10, or processor 202 of computing system 200 implementing the various modules of 3D display system 10, may perform certain processes to display 3D image to one or more users. FIG. 3 shows an exemplary operational process 300 performed by the various modules of 3D display system 10.

As shown in FIG. 3, at the beginning, control module 12 may obtain 3D image (S1). Control module 12 may obtain 3D images from any appropriate sources of 3D image and pictures, such as a DVD or CDROM device, a set top box, a digital receiver, a network adapter, a TV tuner, an information storage device, or other media players.

The 3D images may include at least two sets of images used for 3D display. The 3D images may be in a stereo format, which means that a 3D image includes two images from two viewpoints, a first image and a second image. For example, the 3D image includes a first image to be viewed by a viewer's left eye (i.e., a left image) and a second image to be viewed by the viewer's right eye (i.e., a right image), with a certain parallax between the left image and the right image.

The 3D image may also be in a multi-view format, which means a 3D image includes multiple images from multiple viewpoints. For example, the 3D image may include the first, second, . . . and $N^{th}$ images (N is an integer number greater than 2). A certain parallax exists between two neighboring images of the N images to be viewed by a viewer's left and right eyes respectively.

Figure 4:
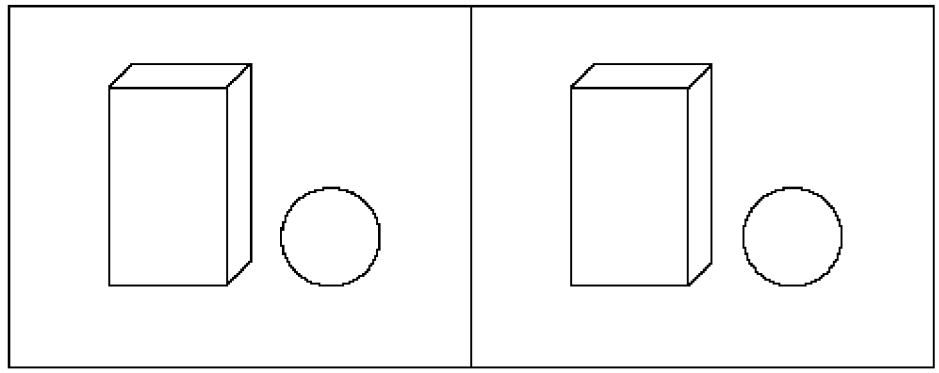
FIG. 4 illustrates exemplary images from different viewpoints consistent with the disclosed embodiments.
Figure 5:
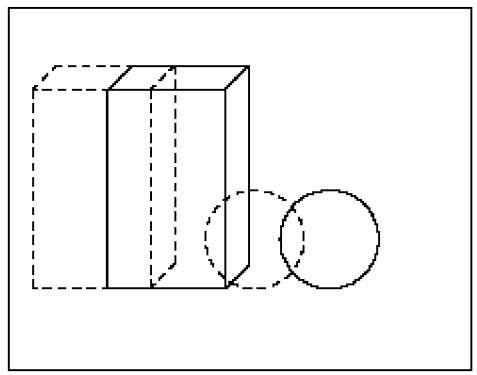
FIG. 5 illustrates a relationship between a 3D image and images from different viewpoints consistent with the disclosed embodiments.

FIGS. 4 and 5 show a relationship between the 3D image, the first image, and the second image (or any two images with certain parallax). As shown in FIG. 4, the left-side picture shows a first image, and the right-side picture shows a second image. As shown in FIG. 5, the first image and the second image are combined or overlapped together, which shows a disparity between the first image and the second image, i.e., the parallax. Also, the parallax between the first image and the second image may be fixed during production and/or operation.

The stereo-format 3D image data may be stored and transmitted in a certain video format. Also, the 3D image data may be generated by a video capturing device (such as a camera) in real-time or by certain video authoring software. If a video playback program, such as a video-on-demand system, uses DirectShow framework or other applications for video processing, control module 12 may obtain every video frame in real-time. Each frame contains a 3D image. Control module 12 may also determine a total number of images in a video frame and obtain individual images. For example, if there are two images (a stereo video frame), control module 12 may separate a first image and a second image from the 3D image frame data.

After obtaining the images associated with a 3D image frame (S1), detection module 11 may detect a type of the display device (S2). For example, detection module 11 may detect whether the type of the display device is an autostereoscopic display device or a stereoscopic display device. Further, detection module 11 may also determine a required or desired number of images needed for the particular type of 3D display device (S3).

Different types of 3D display devices may require different video source formats. For example, a stereoscopic display device may require a viewer to wear special glasses when watching the 3D display. With the help of the special glasses, the stereoscopic display device may only need two images (a stereo format) for displaying a 3D image. On the other hand, for an autostereoscopic display device, a user may watch the 3D display without wearing any special glasses. The autostereoscopic display device thus may need a multi-viewpoint video source format and may require multiple images. For example, in order to achieve a desired 3D display, the autostereoscopic display device may need 9 images. Also, certain amount of parallax among the 9 images should be within a certain range.

Control module 12 may obtain the total number of images required, and may adjust the number of images of the current 3D image frame to the total number required (S4). For example, control module 12 may compare the total number of images required by the particular type of display device with the total number of original images in the 3D image frame. If the two numbers match, no adjustment as to the number of images is needed. On the other hand, if the two numbers do not match, control module 12 may adjust the number of images to match the number as required by the particular display device.

For example, if the number of original images is less than the number required by the particular display device, control module 12 may increase the number of images by adding additional images such that the two numbers match. This may happen, for example, when using an autostereoscopic display device to display 3D image made for a stereoscopic display device requiring glasses, or made for another autostereoscopic display device using less number of images.

On the other hand, if the number of original images is greater than the number required by the particular display device, control module 12 may reduce the number of original images by deleting certain original images such that the numbers match. This may happen, for example, when using a stereoscopic display device to display a 3D image made for an autostereoscopic display device, or when using an autostereoscopic display device to display a 3D image made for another autostereoscopic display device using more number of images.

More particularly, when deleting images, control module 12 may delete those images appearing at the edges of a display screen or an actual display window. On the other hand, when adding images, control module 12 may determine to generate additional number (i.e., the difference between the original number and the total number required by the display device) of auxiliary images using an interpolation method. Image generation module 13 may generate the additional auxiliary images under the control of control module 12.

Control module 12 may determine certain relationships between the original images, such as a parallax related relationship or other time or space based relationship. For example, if the original 3D image frame is in a stereo format and has two images, while the display device is an autostereoscopic display device requires N images, control module 12 may determine to generate N−2 auxiliary images. Further, control module 12 may determine a parallax relationship between the original first image and the original second image, and create a matching table between the first image and the second image.

Figure 6:
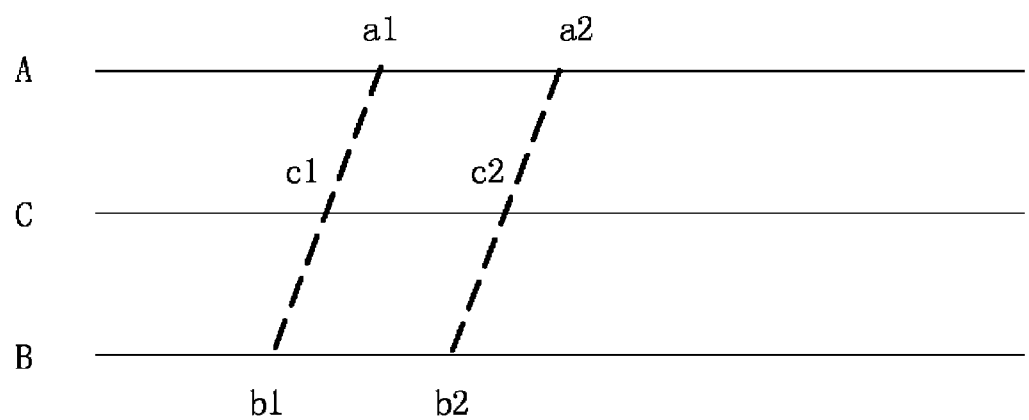
FIG. 6 illustrates an exemplary shifting interpolation approach consistent with the disclosed embodiments.

The matching table may contain a matching relationship between any pair of corresponding points in the first image and the second image, such as respective locations and/or associated parallax distance. After the matching relationship between the first image and second image has been determined, new viewpoints may be inserted and new images may be created based on the first and second images using interpolation. FIG. 6 shows an exemplary interpolation approach consistent with the disclosed embodiments.

As shown in FIG. 6, a stereo format is used for the 3D images, other formats may also be used. A first image is represented by a plane A, and a second image is represented by a plane B. A matching relationship table is created to reflect the relationship between the first image and the second image. That is, to find in plane B (the second image) points or pixels corresponding to points or pixels in plane A (the first image); or to find in plane A points or pixels corresponding to points or pixels in plane B (the second image). Further, the parallax can also be determined as the distance between the first image and the second image (i.e., an average parallax distance) and/or between each pair of corresponding points in the first image and the second image.

For example, as shown in FIG. 6, point a1 in the first image (plane A) corresponds to point b1 in the second image (plane B); and point a2 in plane A corresponds to point b2 in plane B. The matching relationship is then illustrated by dotted lines a$1b1$ and a$2b2$ between plane A and plane B (i.e., respective parallax). All points or pixels in the first image and second image may be matched (unmatched points may be marked as well). Further, a third image of a new viewpoint may be added. The third image may be represented by plane C.

The third image (plane C) may be created through interpolation based on the first image (plane A) and the second image (plane B). For example, a point of the third image corresponding to point a1 in the first image and point b1 in the second image can be derived as the intersection between line a$1b1$ and plane C, and another point of the third image corresponding to point a2 in the first image and point b2 in the second image can be derived as the intersection between line a$2b2$ and plane C. Similarly, all points of the third image may be constructed based on the first image and the second image and the relationship between the first and second images. Further, more than one new images may be created based on the first image and the second image and the relationship between the first and second images.

After adjusting the number of images in the 3D images (S4), image generation module 13 may combine the various images corresponding to all viewpoints to generate a 3D image and send the 3D image to display module 14 for 3D display (S5). That is, image generation module 13 may synthesize a 3D image signal including the various images corresponding to all viewpoints and the synthesized 3D image signal is sent to display module 14 for displaying a new 3D image corresponding to the synthesized 3D image signal. For example, generation module 13 may combine the various images using certain pixel arrangement algorithms. Other combination methods may also be used.

By dynamically adjusting the number of images according to a particular type of 3D display device, the disclosed systems and methods may provide desired display compatibility, display quality, and efficiency. Other advantages and applications are also obvious to those skilled in the art.

What is claimed is:

1. A method for a three-dimensional (3D) display system, comprising:

obtaining a plurality of original images of a plurality of original viewpoints in a 3D image;

detecting a type of a display device for displaying the 3D image;

determining a total number of required images of required viewpoints based on the detected type of the display device;

determining whether the total number of required images is equal to a total number of the plurality of original images; and when the total number of required images is not equal to the total number of the plurality of original images, adjusting the plurality of original images such that the total number of required images are provided to achieve the required viewpoints of the display device, wherein adjusting the plurality of original images further includes:

when the total number of required images is less than the total number of the plurality of original images, deleting a number of original images at edges of an actual display window such that the total number of required images are provided to achieve the required viewpoints of the display device; and when the total number of required images is greater than the total number of the plurality of original images, creating a number of auxiliary images based on the original images such that the total number of required images are provided to achieve the required viewpoints of the display device.

2. The method according to claim 1, wherein creating further includes:
creating a matching relationship table between at least a first original image and a second original image based on parallax information between the first original image and the second original image; and
creating an auxiliary image using interpolation between the first original image and the second original image based on the matching relationship table.

3. The method according to claim 1, further comprising:
combining the total number of required images into a new 3D image; and
sending the new 3D image to the display device for 3D display.

4. A three-dimensional (3D) display system, comprising:
a display module;
a detection module configure to:
    detect a type of a display device of the display module; and
    determine a total number of required images of required viewpoints based on the detected type of the display device;
a control module configured to:
    obtain a plurality of original images of a plurality of original viewpoints in a 3D image;
    determine whether the total number of required images is equal to a total number of the plurality of original images; and
    when the total number of required images is not equal to the total number of the plurality of original images, to adjust the plurality of original images such that the total number of required images are provided to achieve the required viewpoints of the display device,
wherein, to adjust the plurality of original images, the control module is further configured to:
    when the total number of required images is less than the total number of the plurality of original images, delete a number of original images at edges of an actual display window such that the total number of required images are provided to achieve the required viewpoints of the display device; and
    when the total number of required images is greater than the total number of the plurality of original images, create a number of auxiliary images based on the original images such that the total number of required images are provided to achieve the required viewpoints of the display device.

5. The 3D display system according to claim 4, wherein the image generation module is further configured to:
create a matching relationship table between at least a first original image and a second original image based on parallax information between the first original image and the second original image; and
create an auxiliary image using interpolation between the first original image and the second original image based on the matching relationship table.

6. The 3D display system according to claim 4, further comprising:
an image generation module configured to:
    combine the total number of required images into a new 3D image; and
    send the new 3D image to the display device for 3D display.

7. A non-transitory computer readable medium containing executable computer instructions for performing a method for a three-dimensional (3D) display system, the method comprising:
obtaining a plurality of original images of a plurality of original viewpoints in a 3D image;
detecting a type of a display device for displaying the 3D image;
determining a total number of required images of required viewpoints based on the detected type of the display device;
determining whether the total number of required images is equal to a total number of the plurality of original images; and
when the total number of required images is not equal to the total number of the plurality of original images, adjusting the plurality of original images such that the total number of required images are provided to achieve the required viewpoints of the display device,
wherein adjusting the plurality of original images further includes:
    when the total number of required images is less than the total number of the plurality of original images, deleting a number of original images at edges of an actual display window such that the total number of required images are provided to achieve the required viewpoints of the display device; and
    when the total number of required images is greater than the total number of the plurality of original images, creating a number of auxiliary images based on the original images such that the total number of required images are provided to achieve the required viewpoints of the display device.

8. The non-transitory computer readable medium according to claim 7, wherein creating further includes:
creating a matching relationship table between at least a first original image and a second original image based on parallax information between the first original image and the second original image; and
creating an auxiliary image using interpolation between the first original image and the second original image based on the matching relationship table.

9. The non-transitory computer readable medium according to claim 7, the method further comprising:
combining the total number of required images into a new 3D image; and
sending the new 3D image to the display device for 3D display.

* * * * *